Oct. 8, 1935.  J. LEFLAR  2,016,943
WHEEL SUPPORT FOR TESTING APPARATUS
Filed July 28, 1932   2 Sheets—Sheet 1
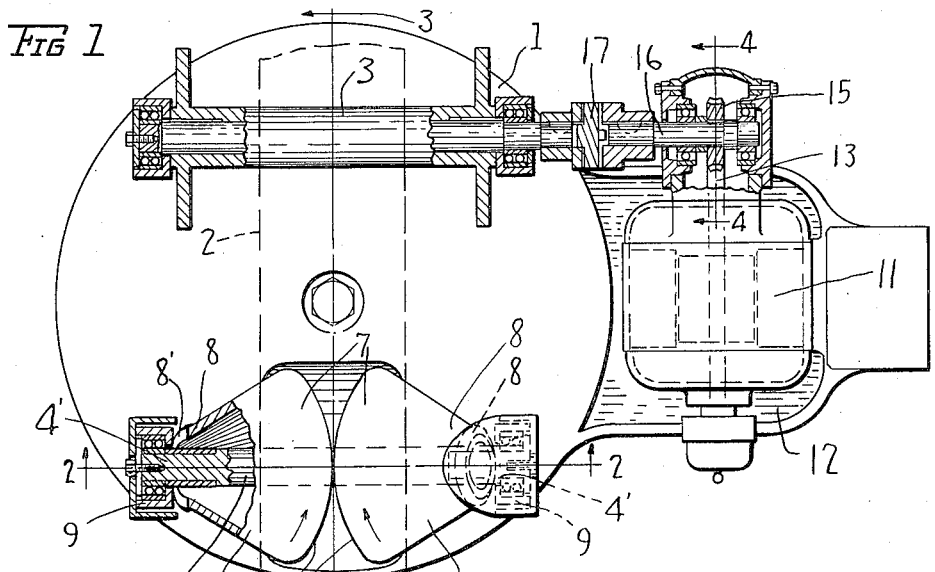
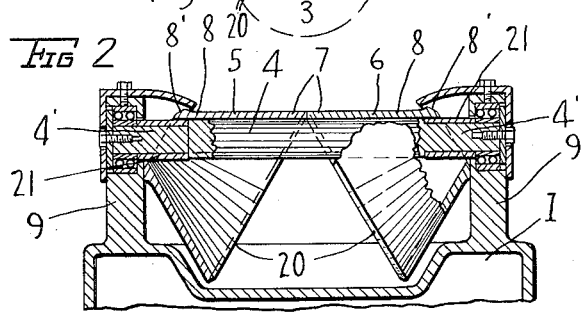
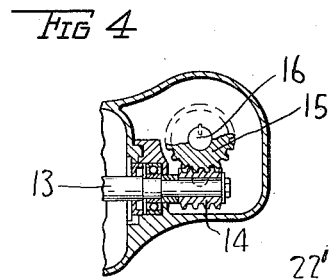
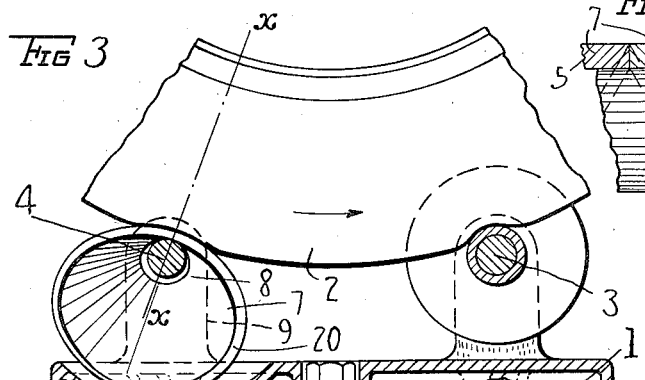
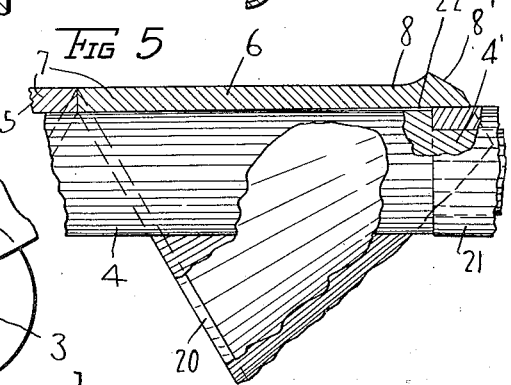
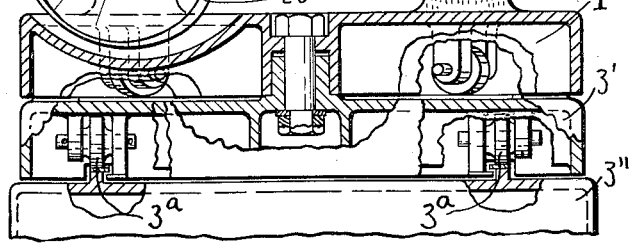
INVENTOR
Jerome Leflar
Stanley Welch
ATTORNEYS Oct. 8, 1935.  J. LEFLAR  2,016,943
WHEEL SUPPORT FOR TESTING APPARATUS
Filed July 28, 1932  2 Sheets-Sheet 2
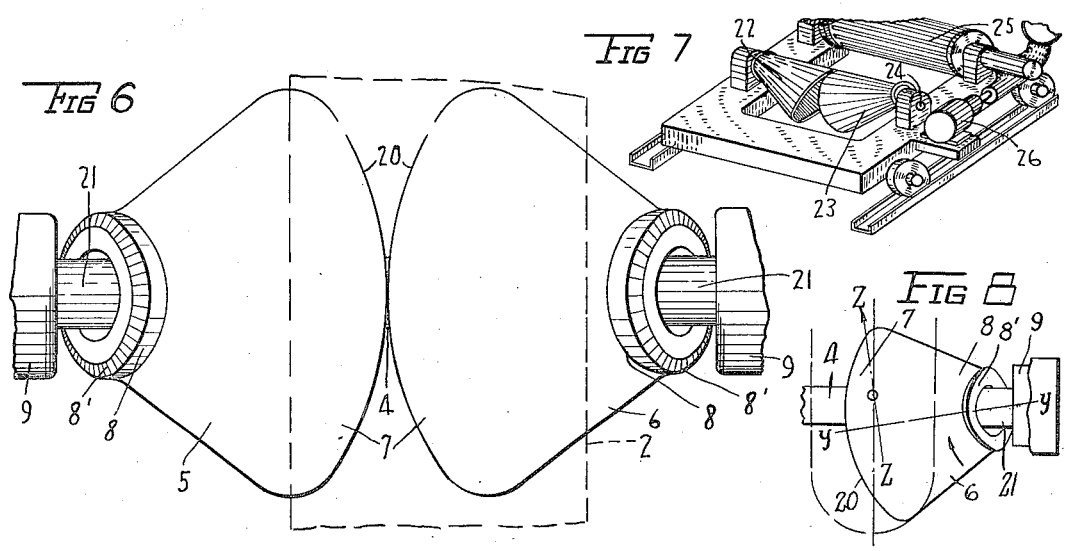
INVENTOR
Jerome Leflar
BY
ATTORNEYS Patented Oct. 8, 1935

2,016,943

UNITED STATES PATENT OFFICE 2,016,943

WHEEL SUPPORT FOR TESTING APPARATUS

Jerome Leflar, Dayton, Ohio, assignor, by mesne assignments, to The Master Electric Company, Dayton, Ohio, a corporation of Ohio Application July 28, 1932, Serial No. 625,281

11 Claims. (Cl. 73—51)

This invention relates to improvements in devices for testing the steering apparatus of motor vehicles, although the improvements are also applicable to other testing devices such as brake testing machines. The invention more particularly relates to that part of the devices which are used for supporting the vehicle wheels while making tests, and especially relates to means for bringing the support and vehicle wheel in centralized position with respect to each other.

One of the objects of the invention is to provide simple and effective devices consisting of a power-driven roller and idle centering rollers capable of supporting the steering wheels of automobiles and upon rotation of the steering wheel by power applied to the power roller the steering wheel is automatically brought to the center of the device by the action of the centering rollers.

In the accompanying drawings:

Fig. 1 is a view partly in plan and partly in transverse section of an apparatus embodying the improvements.

Fig. 2 is a transverse section on the line 2—2 of Fig. 1.

Fig. 3 is a fragmentary longitudinal section on the line 3—3 of Fig. 1.

Fig. 4 is a fragmentary longitudinal section on the line 4—4 of Fig. 1.

Fig. 5 is a fragmentary elevation of portions of the improved centering rollers partly in transverse section, the sectional portions being taken on the line 2—2 of Fig. 1 to show more clearly the method of supporting the centering rollers.

Fig. 6 is an enlarged top plan view of some of the details shown in Fig. 1, it being a diagrammatic view of the centering devices to show the action thereof.

Fig. 7 is a fragmentary perspective view of a portion of a brake testing machine shown in conventional form to illustrate another method of employing the centering rollers.

Fig. 8 is a view somewhat diagrammatic in character showing the position assumed by one of the centering rolls when the weight of the vehicle is thereon.

The centering devices herein described are especially adaptable for use in connection with the steering gear testing apparatus which forms the subject-matter of a co-pending application of Clyde H. Phelps, Serial No. 650,435, filed January 6th, 1933, and are shown and described in that application. The vehicle steering wheel is supported on a wheel-supporting means, one member of which is capable of lateral movement.

In the present drawings, a rotary supporting member is indicated at 1, being shown in Fig. 3 and rotatably mounted upon an intermediate member 3' to permit the vehicle wheels to be readily turned to different steering positions in testing camber and caster and to also permit the wheels to cause relative rotation of the support to detect any misalignment of the wheels. This intermediate member is mounted for lateral movement upon a third member 3'' which is mounted for longitudinal movement upon a base which is not shown in the present case but is fully described in the Phelps application referred to. The outline of a portion of the vehicle wheel and tire is shown in broken lines at 2 (Figs. 1 and 6), and in full lines in Fig. 3, and when in place on the unit the wheel rests on a roller 3 which will be known as a power roller and also indirectly on a rotatable shaft 4 having interposed between the shaft 4 and the wheel, a pair of centering rollers 5 and 6.

In making certain of the tests of a vehicle steering gear of which the Phelps' invention is capable, it is essential that the rotary member of the left unit represented at 1 and its complementary member of the right unit (not shown) to be each centrally positioned below the steering wheel mounted thereon, not only referring to the position of the steering wheel with reference to its longitudinal central position which is insured by the equi-distant spacing of the power roller 3 and the centering rollers 5 and 6, but laterally, as well, referring here to the positioning of the plane of the wheel with respect to the axis of rotation of the rotary member, as shown by the central positioning of the wheel outline 2 in Fig 1.

The centering operation is quickly and conveniently accomplished by employing the centering rollers 5 and 6. The centering rollers 5 and 6 in the present instance are hollow cones of uniform wall thickness and are loosely supported on the idle shaft 4. Due to the location of the centers of gravity of the rollers the rollers hang from the idle shaft 4 and present an approximately flat surface for the reception of a vehicle wheel and wheels of various diameters are readily accommodated.

The centering rollers are placed on the idle shaft 4 in such manner that the large ends 7 thereof are adjacent each other, while the smaller ends 8 bear against the inner surfaces of the forward pair of columns 9 which support the idle shaft 4, whereby the thrust which is imposed on the centering rollers in a manner to be explained is transmitted to these columns. The columns 9 which project vertically from the upper surface of the lateral member 1 are equidistantly spaced from the longitudinal center line 3—3 (Fig. 1) thereof, and since the centering rollers are identical the edges of the large ends 7 lie directly over the longitudinal center line 3—3.

Rotation of the steering wheel is brought about by power means, there being a small electric motor 11 mounted on a projecting bracket 12 integrally attached to the member 1, which motor is connected by a worm and worm-wheel gearing to the power roller 3. The shaft of the motor is indicated at 13, the worm is represented at 14 and the worm-wheel at 15 (Figs. 1 and 4). Connection of the shaft 16 carrying the worm wheel with the power roller 3 is made in the present case by the small self aligning connection shown conventionally at 17 (Fig. 1).

The actual contact of the steering wheel with the power and centering rollers obviously is made by the tire of the vehicle wheel, which is usually a rubber tire of the pneumatic or solid type, and utilization is made of the tendency which exists during rotation of the wheel on these rollers wherein a centering roller tends to force the wheel laterally from its surface in a manner which will be explained as follows:

The direction of rotation of the centering rolls is indicated by the arrows in Figs. 1 and 8. In all of the figures, excepting Figs. 3 and 8, the centering rolls are shown in the position they will occupy when the weight of the vehicle is not thereon. For instance, in Fig. 1 the rolls are shown hanging by their own weight from the shaft 4 and in hanging in this manner the longitudinal axes of the rollers are in the same vertical plane as the longitudinal axis of the shaft 4. When a vehicle wheel is placed on the support it rests on the power roller 3 and the centering rollers 5 and 6. This form of two-point support causes the centering rollers to swing from the idle downwardly hanging position to the position shown in Fig. 3 and Fig. 8 where it will be seen that the longitudinal axes of the rollers 5 and 6 will cross an inclined plane represented by a line passing through the longitudinal axis of the shaft and the axis of the vehicle wheel itself, such as the line $x$—$x$ in Fig. 3. Since the rollers 5 and 6 are hollow cones resting on the shaft 4 the forward swing of the rollers as shown by the hanging portion of the roller 5 in Fig. 3 will skew the rollers to the position shown in connection with the roller 6 shown in Fig. 8, whereby the axis of rotation of the roller 6 is now in an angular position, as represented by the line $y$—$y$, with respect to the planar center of the vehicle wheel. The influence exerted by this roller upon the vehicle tire will, therefore, be in the direction of the arrow $z$—$z$, and as the roller rotates, will produce a lateral thrust upon the wheel tending to force the wheel to the larger end of the roller. The theoretical center point of the contact of the vehicle tire with the roller 6 will be about at the point represented by the small circle C in Fig. 8 and the thrust of the centering roller exerted upon the tire is in the direction of the arrow $z$—$z$ on all portions of the tire forwardly of the contact point. Any portion of the tire which contacts the centering roll on the opposite side of the contact point is principally in a direction parallel with the direction of rotation of the wheel and would not, therefore, offset to any appreciable extent the thrust exerted along the line represented by the arrow $z$—$z$. Since in the present instance (excepting the construction shown in Fig. 7) the support is movable with respect to the wheel, this lateral thrust causes the support to be moved in the direction opposite to the direction of the thrust until the vehicle wheel centers itself upon the rolls.

Thus, where a vehicle wheel has a larger area of engagement with one centering roll than with the other, as shown in Fig. 6, by the off-center position of the wheel 2, the larger engaged area on the roll 6 will exert a thrust in a direction toward the meeting point of the centering rolls until the wheel has become centered on the rolls, whereupon the thrust upon the wheel will be the same in either direction and the wheel will remain centered.

During the rotation of the wheel, the thrust imposed on the centering rollers tends to force these rollers outwardly towards the columns and the small ends of the rollers are therefore machined to present a surface indicated at 8' whereby the thrust is transmitted to the columns.

Provision is made to compensate for the difference in linear speed of the small end 8 of the centering roller as compared with the large end 7 thereof. Referring to the roller 5 in Fig. 2 it will be seen that the small end is about one-third the diameter of the large end and a true rolling movement of the centering roller can not be obtained, as the smaller end tends to climb the shaft and slip back causing considerable friction at one or the other end of the rollers at the point of contact of the roller with the idle shaft 4. Provision is made to allow the smaller ends of each centering roller to be separately supported on a revoluble bushing or sleeve 21 (Fig. 2), a sleeve 21 being rotatably fitted on reduced diameter extensions 4' of the idle shaft 4. The arrangement is shown in exaggerated form in Fig. 5 wherein the centering roller 6 is shown partly in elevation and partly in longitudinal section at the point of contact with the idle shaft 4 and sleeve 21. The sleeve 21, being slightly larger in diameter than the shaft 4, receives the small end 8 of the centering roller 6 while the large end rests directly on the idle shaft 4 and thereby presents a small clearance space 22' extending from the point of contact of the large end 7 of the centering roller 6 to the point of contact of the small end with the sleeve 21 (Fig. 5). Therefore, during rotation of the centering rollers the sleeves 21 rotate about the extensions 4' of the idle shaft 4 and the shaft rotates with the rollers, thereby eliminating the friction which would otherwise result if the conical rollers were supported on a straight cylindrical shaft. By this construction, it is not necessary to lubricate the centering rollers at their bearing on the shaft 4, thereby allowing the outer surfaces of the rollers to be maintained in the clean, dry condition necessary to provide sufficient traction of the tire on the centering rollers, the small amount of lubrication necessary for the sleeves 21 being easily confined thereto.

Referring to Fig. 7 the application of the preferred form of centering rollers to a portion of a brake testing device is shown. The centering rollers are indicated at 22 and 23 hanging loosely from the idle supporting shaft 24; a corrugated roller 25 is a power roller and is driven by the electric motor 26 through the worm and worm wheel gearing (not shown).

In operation, in the present case the centering of the wheel upon the support is accomplished by a lateral movement of the member 3' upon the member 3''. To facilitate this lateral movement, the member 3' is mounted upon the member 3'' through the medium of rollers 3ª, the vehicle wheel remaining in its initial position.

Having thus described my invention, I claim:

1. In a testing apparatus for vehicle wheels, a stationary base, and a rotatable wheel support mounted on said base for movement with respect thereto laterally of the direction of travel of the wheel, said wheel support comprising means to exert lateral thrusts in opposite directions upon the wheel tread, whereby a relative movement is caused between the base and support and between the support and wheel until said thrusts are equalized.

2. In a testing apparatus for vehicle wheels, a base, a rotatable vehicle wheel support movably mounted thereon, said support comprising a pair of edge-to-edge rotatable wheel-receiving members, said members, when the weight of the vehicle wheel is thereon, having the major portions of their points of contact with the vehicle wheel rotatable in directions at angles to the direction of travel of the vehicle wheel which converge toward each other so as to oppose thrusts in opposite directions upon the wheel tread to cause relative movement between said wheel and support and between the support and base laterally to the direction of rotation of the wheel until said thrusts are equalized.

3. In a testing apparatus for vehicle wheels, a stationary base, a rotatable vehicle wheel support mounted on said base for lateral movement with respect thereto and with relation to the plane of a vehicle wheel mounted on said support, said support comprising a pair of edge-to-edge wheel-receiving members, said members, when the weight of the vehicle wheel is thereon, having the major portions of their points of contact with the vehicle wheel rotatable in directions at angles to the direction of travel of the vehicle wheel which converge toward each other so as to impose thrusts in opposite directions upon the wheel tread to cause said support to move laterally with respect to the plane of the vehicle wheel and with respect to the base until said thrusts are equalized.

4. In a testing apparatus for vehicle wheels, a stationary base, a rotatable vehicle wheel support mounted on said base for lateral movement with respect thereto and with relation to the plane of a vehicle wheel mounted on said support, said support comprising a pair of rotatable edge-to-edge wheel-receiving members, said members, when the weight of the vehicle wheel is thereon, having the major portions of their points of contact with the vehicle wheel rotatable in a direction at angles to the direction of travel of the vehicle wheel which converge toward each other so as to impose thrusts in opposite directions upon the wheel tread to cause said support to move laterally with respect to the plane of the vehicle wheel and with respect to the base until said thrusts are equalized, said wheel support also comprising a driven roll to impart rotary movement to the vehicle wheel.

5. In a testing apparatus for vehicle wheels, a rotatable vehicle wheel support, said support comprising a pair of rotatably and loosely mounted side-by-side hollow rollers of conical form both exteriorly and interiorly with their large ends adjacent adapted to receive the vehicle wheel and impose thrusts upon the vehicle in opposite directions with relation to the direction of rotation of the wheel when the wheel is rotated, said support and the wheel being capable of relative movement laterally with respect to the direction of rotation of the wheel.

6. In a testing apparatus for vehicle wheels, a rotatable vehicle wheel support, said support comprising a pair of side-by-side loosely-mounted hollow rollers of conical form both exteriorly and interiorly with their large ends adjacent adapted to receive the vehicle wheel and impose thrusts upon the wheel in opposite directions with respect to the direction of rotation of the wheel when the wheel is rotated, said support being capable of a movement laterally with relation to the plane of the wheel.

7. In an apparatus for testing vehicle wheels, a vehicle wheel support, said support comprising a pair of rotatably and loosely mounted side-by-side hollow rollers of conical form both exteriorly and interiorly with their large ends adjacent adapted to receive the vehicle wheel and impose thrusts upon the wheel in opposite directions with respect to the direction of rotation of the wheel when the wheel is rotated, said support including means to impart rotary movement to said wheel, said support and the wheel being capable of a relative movement laterally with respect to the direction of rotation of the wheel.

8. In an apparatus of the character described, a vehicle wheel support, said support comprising a pair of rotatably and loosely mounted side-by-side hollow rollers of conical form both exteriorly and interiorly with their large ends adjacent adapted to receive the vehicle wheel and impose thrusts upon the wheel in opposite directions with respect to the plane of the wheel when the wheel is rotated, said support including means to impart a rotary movement to the wheel, said support being capable of a movement laterally with respect to the plane of the wheel.

9. In an apparatus of the character discribed, a vehicle wheel support including a driving roll and a pair of idle rotatable side-by-side loosely-mounted hollow rolls of conical form both exteriorly and interiorly having their large ends adjacent, said support and wheel being capable of a relative movement laterally with respect to the direction of rotation of the wheel.

10. In an apparatus of the character described, a vehicle wheel support, said support including a driving roller to receive and drive the wheel, a shaft spaced from said driving roller and parallel therewith, a pair of hollow rollers of conical form both exteriorly and interiorly rotatably mounted upon said shaft with their large ends adjacent adapted to be rotated by the wheel, said support and the wheel being capable of a relative movement laterally with respect to the direction of rotation of the wheel.

11. In an apparatus of the character described, a rotatable vehicle wheel support including a rotatable shaft, a sleeve rotatably mounted at each end of the shaft, and a pair of idle loosely mounted hollow rolls of conical form both exteriorly and interiorly loosely mounted upon the shaft with their large ends adjacent and bearing on the shaft and their small ends bearing on the sleeves.

JEROME LEFLAR.